United States Patent [19]

Fujihara et al.

[11] Patent Number: 5,379,402
[45] Date of Patent: Jan. 3, 1995

[54] DATA PROCESSING DEVICE FOR PREVENTING INCONSISTENCY OF DATA STORED IN MAIN MEMORY AND CACHE MEMORY

[75] Inventors: Atsushi Fujihara; Takeshi Kitahara, both of Kawasaki, Japan

[73] Assignee: Fujitsu Limited, Kawasaki, Japan

[21] Appl. No.: 108,284

[22] Filed: Aug. 19, 1993

Related U.S. Application Data

[63] Continuation of Ser. No. 553,300, Jul. 17, 1990, abandoned.

[30] Foreign Application Priority Data

Jul. 18, 1989 [JP] Japan .................. 1-183642

[51] Int. Cl.⁶ .................. G06F 12/00; G06F 12/04; G06F 12/12
[52] U.S. Cl. .................. 395/425; 364/DIG. 1; 364/243.41; 364/242.34; 364/252.5; 364/254.3
[58] Field of Search .................. 395/425; 364/200 MS File, 900 MS File, 242.31, 242.33, 252.5, 254.3

[56] References Cited

U.S. PATENT DOCUMENTS

| | | | |
|---|---|---|---|
| 3,699,533 | 10/1972 | Hunter | 364/200 |
| 3,848,234 | 11/1974 | MacDonald | 395/425 |
| 4,228,503 | 10/1980 | Waite et al. | 395/425 |
| 4,280,177 | 7/1981 | Schorr et al. | 395/425 |
| 4,322,795 | 3/1982 | Lange et al. | 364/200 |
| 4,580,240 | 4/1986 | Watanabe | 395/425 |
| 4,638,431 | 1/1987 | Nishimura | 395/425 |
| 4,751,638 | 6/1988 | Azuma | 395/425 |
| 4,755,936 | 7/1988 | Stewart et al. | 395/425 |
| 4,785,398 | 11/1988 | Joyce et al. | 395/425 |
| 4,875,160 | 10/1989 | Brown III | 395/375 |
| 4,885,680 | 12/1989 | Anthony et al. | 395/425 |
| 4,991,090 | 2/1991 | Emma et al. | 395/575 |
| 5,008,813 | 4/1991 | Crane et al. | 395/425 |
| 5,025,366 | 6/1991 | Baror | 364/200 |
| 5,029,070 | 7/1991 | McCarthy et al. | 395/425 |
| 5,058,006 | 10/1991 | Durdan et al. | 364/200 |
| 5,072,369 | 12/1991 | Theus et al. | 395/425 |
| 5,163,142 | 11/1992 | Mageau | 395/425 |
| 5,193,167 | 3/1993 | Sites et al. | 395/425 |

FOREIGN PATENT DOCUMENTS

| | | |
|---|---|---|
| 0090575 | 10/1983 | European Pat. Off. |
| 0288649 | 11/1988 | European Pat. Off. |
| 63-193246 | 8/1988 | Japan |
| 63-223846 | 9/1988 | Japan |
| 1-95344 | 4/1989 | Japan |

Primary Examiner—Joseph L. Dixon
Assistant Examiner—Frank J. Asta
Attorney, Agent, or Firm—Armstrong, Westerman, Hattori, McLeland & Naughton

[57] ABSTRACT

A comparing unit compares an address of data written into a main memory by an external device with an address of data stored in a cache memory, and a masking unit masks specific bits obtained by a result in said address comparing unit. An invalidating unit invalidates data stored in the cache memory corresponding to the specific bits masked by the masking unit. Therefore, inconsistency between the main memory and the cache memory can be prevented, even when the data are transferred by using a block transfer process.

19 Claims, 10 Drawing Sheets

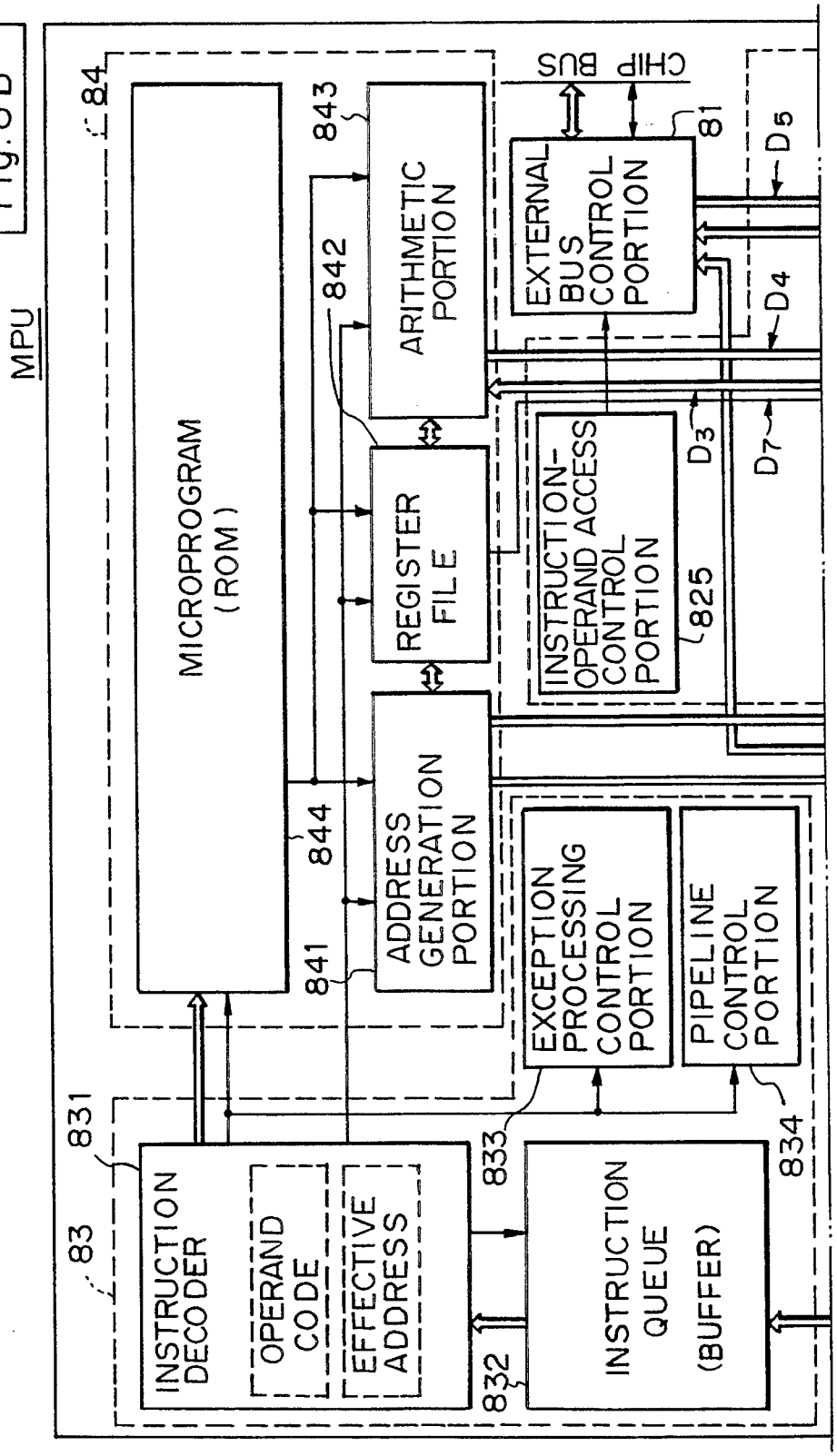

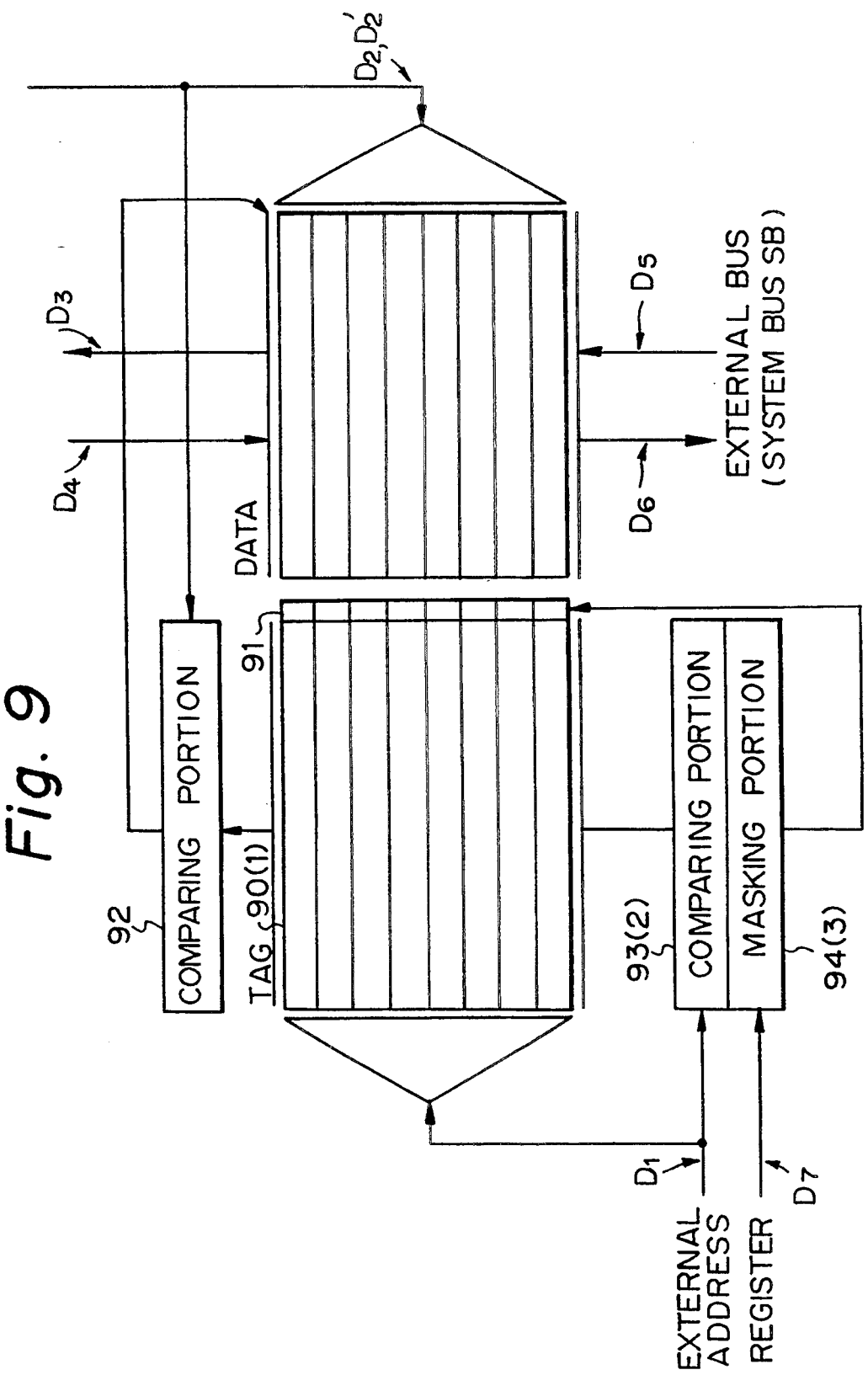

DATA PROCESSING DEVICE FOR PREVENTING INCONSISTENCY OF DATA STORED IN MAIN MEMORY AND CACHE MEMORY

This application is a continuation of application Ser. No. 07/553,300 filed Jul. 17, 1990, now abandoned.

BACKGROUND OF THE INVENTION

1. Field of the Invention

The present invention relates to a data processing device (microprocessing unit), more particularly, to an address monitoring device in a data processing device including a cache memory.

2. Description of the Related Art

Conventionally, in a general address monitoring device, an address (write address) and a write instruction signal are monitored, and when the write address coincides with an address stored in a tag memory, data stored in the tag memory are invalidated.

Recently, in a data processing system having a plurality of microprocessing units or a direct memory access controller, a block transfer process for transferring data is carried out. Note, if the same address data as that written into the cache memory in the microprocessing unit is rewritten being transferred by the direct memory access controller, if the contents of the cache are not invalidated or rewritten, the data written in the cache memory in the microprocessing unit is inconsistent with the data in the main memory. This inconsistency between the main memory and the cache memory must be prevented even when the data are transferred by using a block transfer process.

SUMMARY OF THE INVENTION

It is an object of the present invention to provide a data processing device for preventing inconsistency between a main memory and a cache memory in a data processing device, even if a block transfer process is carried out.

According to the present invention, there is provided an address monitoring device for monitoring a process of writing to a main memory by an external device, and when an address corresponding to data stored in a cache memory is detected in the write process, for invalidating stored address data in the cache memory corresponding to the detected write address, wherein the address monitoring device comprises: a comparing unit for comparing an address of data written into the main memory by the external device with an address of data stored in the cache memory; a masking unit for specifying one or more specific bits within the address of the data stored in the cache memory to compare with the address of the data written into the main memory; and an invalidating unit for invalidating data stored in the cache memory, when a result in the address comparing unit being coincidental.

The address monitoring device may further comprise a mask bit determining unit for determining a bit number for masking in the specific bits. The mask bit determining unit may comprise a plurality of logic gate circuits, and the bit number for masking in the specific bits may be determined by masking control signals supplied to the logic gate circuits. The mask bit determining unit may comprise a masking address control register, and the bit number for masking in the specific bits may be determined by data stored in the masking address control register. The mask bit determining unit may determine the bit number for masking in the specific bits in accordance with a data length of the data written into the main memory.

The data may be written into the main memory by using a block transfer process. The comparing unit and the masking unit may comprise a plurality of logic gate circuits, and the invalidating unit may comprise a tag memory including a valid bit portion.

According to the present invention, there is also provided a data processing device comprising: a bus control unit for transferring data among a main memory and external devices through busses; a memory control unit including a cache memory; an instruction control unit for controlling fetching and decoding of instructions; an instruction execution unit for executing the instructions; a comparing unit for comparing an address of data written into a main memory by the external device with an address of data stored in the cache memory; a masking unit for specifying one or more specific bits within the address of the data stored in the cache memory to compare with the address of the data written into the main memory; and an invalidating unit for invalidating data stored in the cache memory, when a result in the address comparing unit being coincidental.

Furthermore, according to the present invention, there is provided a data processing system having a data processing device, external devices, a main memory, and a system bus for connecting the data processing device, the external devices, and the main memory, wherein the data processing device comprises: a bus control unit for transferring data among the main memory and the external devices through busses; a memory control unit including a cache memory; an instruction control unit for controlling fetching and decoding of instructions; an instruction execution unit for executing the instructions; a comparing unit for comparing an address of data written into a main memory by an external device with an address of data stored in the cache memory; a masking unit for specifying one or more specific bits within the address of the data stored in the cache memory to compare with the address of the data written into the main memory; and an invalidating unit for invalidating data stored in the cache memory, when a result in the address comparing unit being coincidental.

Additionally, according to the present invention, there is also provided a monolithic microprocessor formed in a single semiconductor body, wherein the monolithic microprocessor comprises: a built-in cache memory; an instruction execution unit, for executing an instruction and outputting a write address for accessing the built-in cache memory or a main memory; an address monitoring device comprising: a comparing unit for comparing an address of data written into a main memory by an external device with an address of data stored in a cache memory; a masking unit for specifying one or more specific bits within the address of the data stored in the cache memory to compare with the address of the data written into the main memory; and an invalidating unit for invalidating data stored in the cache memory, when a result in the address comparing unit being coincidental.

BRIEF DESCRIPTION OF THE DRAWINGS

The present invention will be more clearly understood from the description of the preferred embodiments as set forth below with reference to the accompanying drawings, wherein:

FIG. 9 is a block diagram illustrating an address monitoring device provided in the data processing device shown in FIG. 8.

DESCRIPTION OF THE PREFERRED EMBODIMENTS

First, an address monitoring device according to the related art will be explained, with reference to FIGS. 1 to 3.

In a general address monitoring device provided in a data processing device (MPU1), an address of data written in a main memory (M) is monitored, and when the address written in the main memory coincides with an address stored in a cache memory, information in a tag memory corresponding to the consistent address is invalidated.

Figure 1:
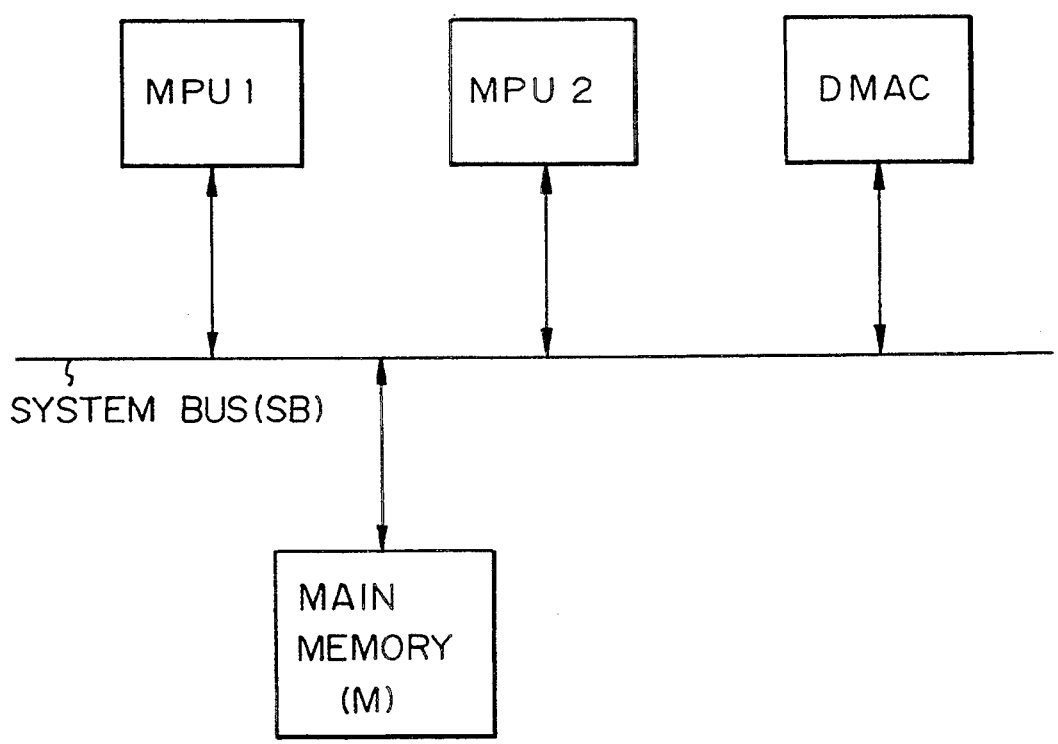
FIG. 1 is a block diagram illustrating an example of a computer system for applying an address monitoring device according to the present invention.

FIG. 1 is a block diagram illustrating an example of a computer system for applying an address monitoring device according to the present invention.

As shown in FIG. 1, a computer system comprises a plurality of data processing devices (microprocessor units) MPU1, MPU2, a direct memory access controller DMAC, a main memory M, and a system bus for connecting among the microprocessor units MPU1, MPU2, the direct memory access controller DMAC, and the main memory M. Note, any of these microprocessor units MPU1, MPU2 and the direct memory access controller DMAC can be a bus master and can use the system bus SB to write data into the main memory M through the system bus SB. Namely in the computer system shown in FIG. 1, data in the main memory M can be written or changed by all of the microprocessor bits MPU1, MPU2 and the direct memory access controller DMAC, In the computer system shown in FIG. 1, for example, when the same addresses as addresses of data (data addresses) stored in a cache memory of the microprocessor unit MPU1 are rewritten by data transferring by the direct memory access controller DMAC, the contents of the cache memory should be invalidated or rewritten to prevent inconsistency between data stored in the cache memory of the microprocessor unit MPU1 and other data stored in the main memory M. This inconsistency between the main memory M and the cache memory (for example, the cache memory of the microprocessor unit MPU1) should be prevented, even when a block transfer process is being carried out.

Figure 2:
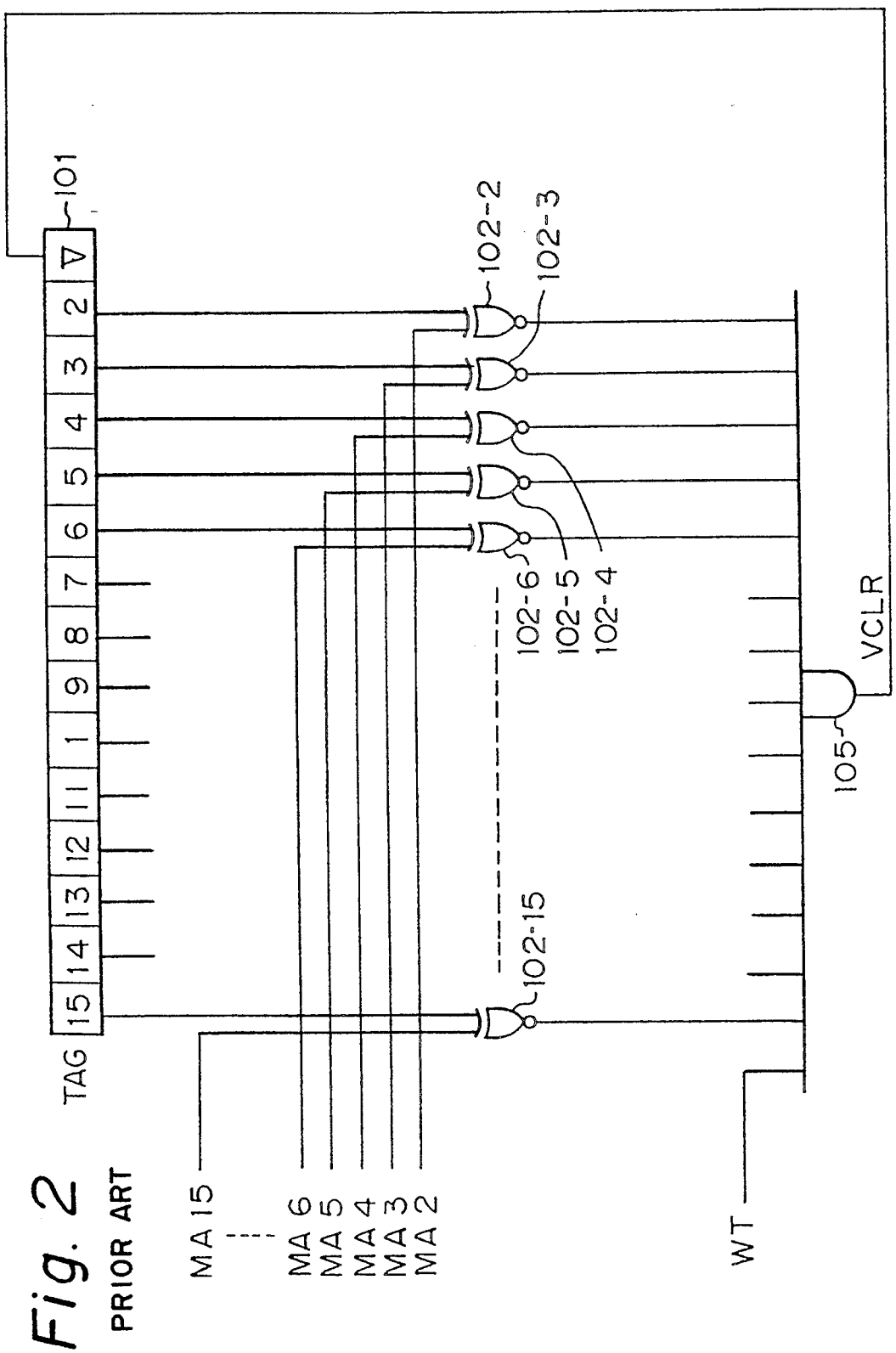
FIG. 2 is a circuit diagram illustrating an example of an address monitoring device according to the related art.

FIG. 2 is a circuit diagram illustrating an example of an address monitoring device according to the related art.

As shown in FIG. 2, the address monitoring device of the related art comprises a plurality of ENOR gates 102-2 to 102-15, and an AND gate 105 supplied with output signals of the ENOR gates 102-2 to 102-15 and a timing signal WT for determining write timings for the main memory M, The inputs of the ENOR gates 102-2 to 102-15 are supplied with addresses 2 to 15 stored in a tag memory 101 corresponding to data stored in the cache memory (for example, the cache memory of the microprocessor unit MPU1), and with access addresses MA2 to MA15 which are also supplied to the main memory M from the other bus masters (for example, the other microprocessor unit MPU2 or the direct memory access controller DMAC), When the addresses 2 to 15 stored in a tag memory 101 coincide with the access addresses MA2 to MA15 for the main memory M, each of the ENOR gates 102-2 to 102-15 outputs a high level signal to the AND gate 105. When all input signals including the timing signal WT of the AND gate 105 are at high levels, the AND gate 105 outputs a signal VCLR at a high level to the tag memory 101 for invalidating valid bits of the tag memory 101. Note, the address range compared by the address monitoring device comprises the addresses representing one word or one line stored in the tag memory 101.

The above described address monitoring device has no problem when the data are transferred by individual address units. However, if the address monitoring device carries out a block transfer process, that is, if only a beginning address is supplied to the main memory M and the following addresses are not supplied but are incremented sequentially in the main memory M for transferring (rewriting) data of a predetermined address range in the main memory M, inconsistency between data stored in the main memory M and the corresponding data stored in the cache memory of the microprocessor unit MPU1 can occur.

Figure 3:
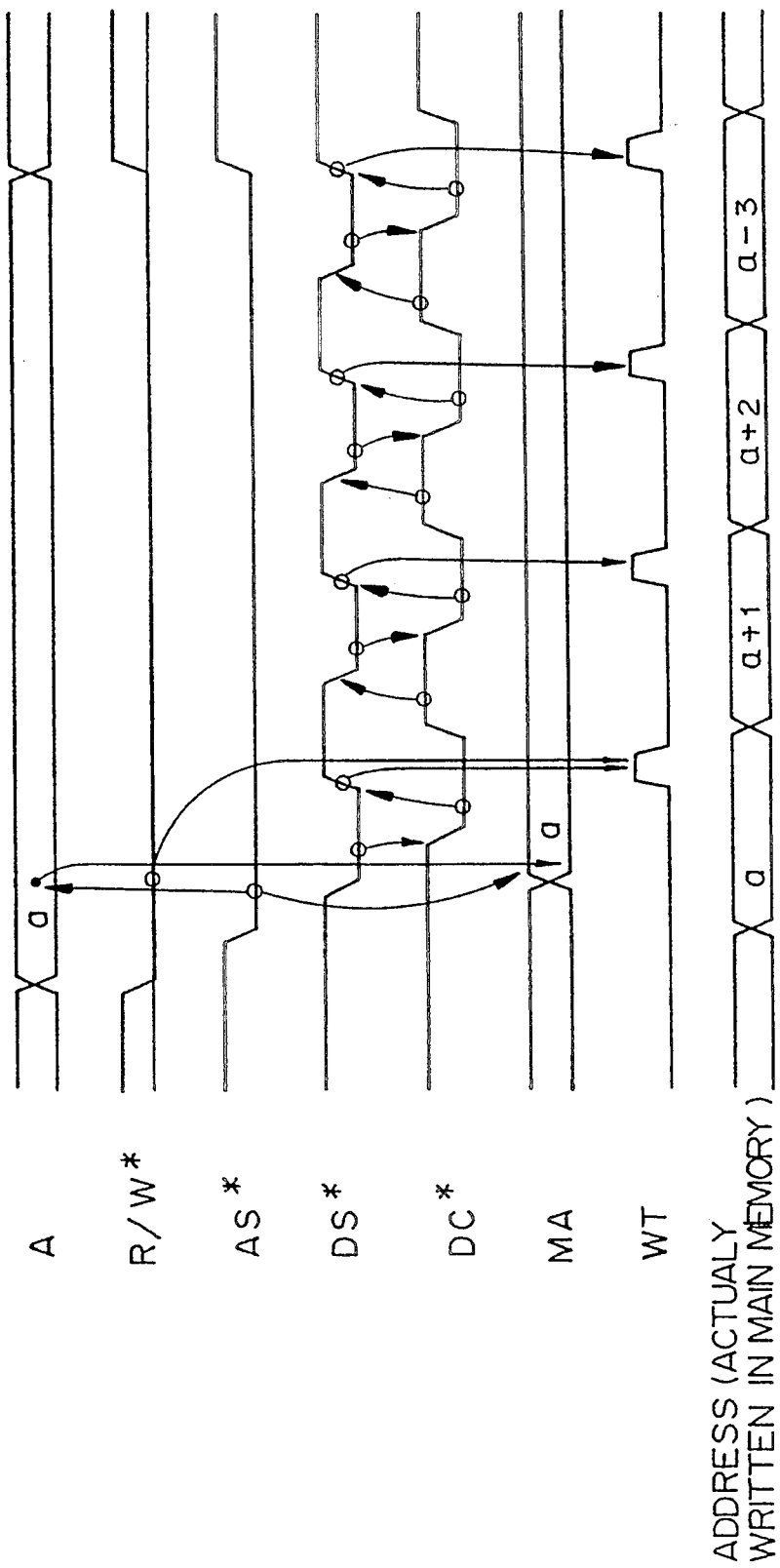
FIG. 3 is a time chart illustrating a block transfer process.

FIG. 3 is a time chart illustrating a block transfer process.

As shown in FIG. 3, if the block transfer process is carried out by another MPU or the DMAC, an address A is specified, a read.write signal R/W* changes to a low level, and then an address strobe signal AS* changes to a low level, so that a data transfer process (block transfer process) is started. Further, when a data strobe signal DS* changes to a low level, a data transfer process is carried out, and after completing the data transfer process, a data complete signal DC* changes to a low level, and these processes (handshaking) are continuously carried out. Namely, the data strobe signal DS* and a data complete signal DC* sequentially responds to be output, and the respective address data are sequentially incremented to be transferred. More specifically, in the block transfer process, only the beginning address is supplied to the main memory M, and data transfer (rewriting) of following addresses within a specific address range is continuously carried out by incrementing the address in the main memory M.

Therefore, if the block transfer process is carried out, inconsistency between the data stored in the main memory M and the corresponding data stored in the cache memory may occur, as practical addresses (addresses of the specific address range for writing into the main memory M) are different from an address supplied to the main memory M through the system bus SB (the beginning address of the specific address range).

Below, the preferred embodiments of an address monitoring device and a data processing device according to the present invention will be explained, with reference to the accompanying drawings.

Figure 4:
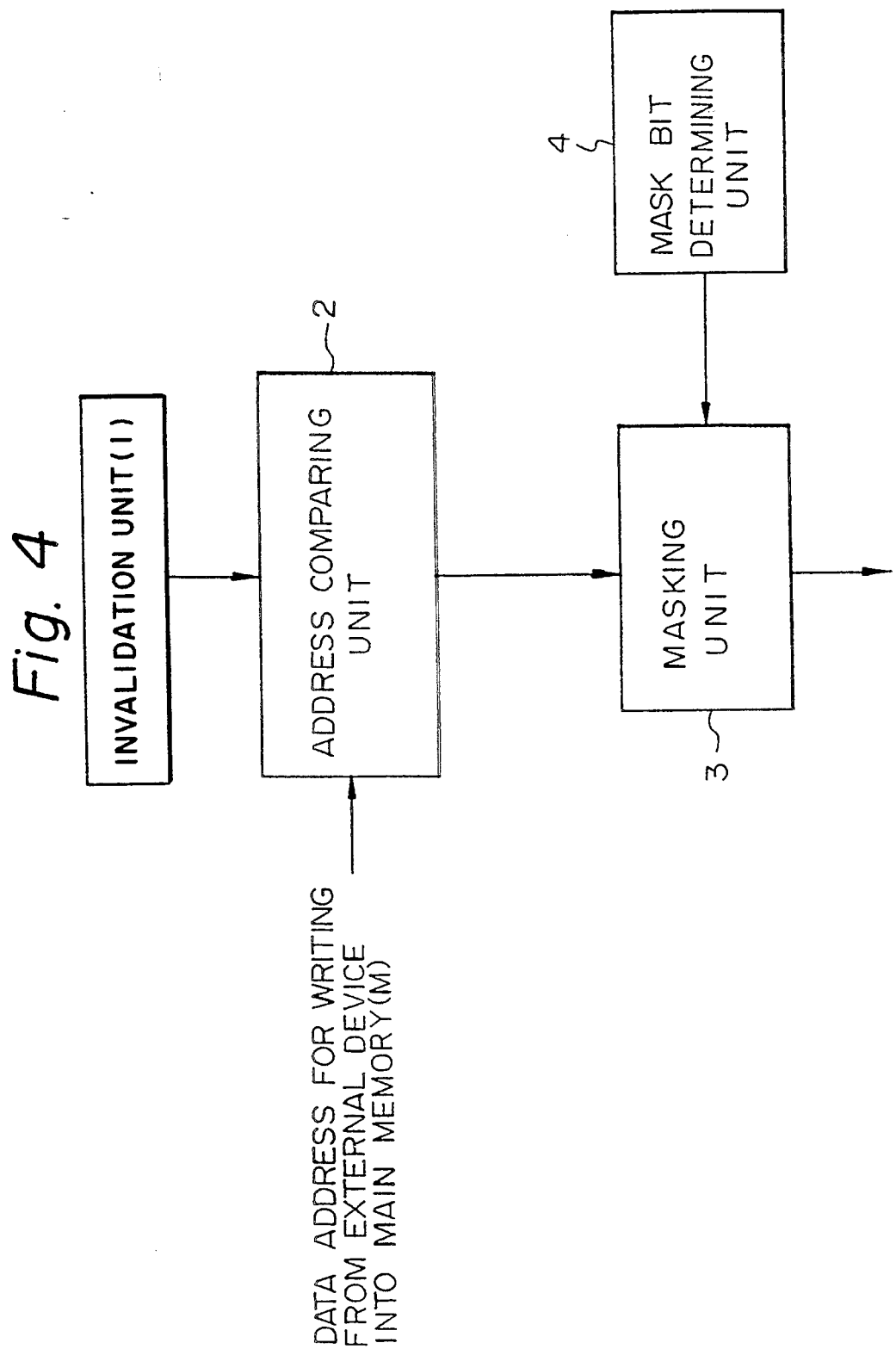
FIG. 4 is a diagram illustrating a principle of an address monitoring device according to the present invention.

FIG. 4 is a diagram illustrating a principle of an address monitoring device according to the present invention.

In an address monitoring device according to the present invention, a write process by an external device to a main memory is monitored, and when an address corresponding to data stored in a cache memory is detected in the write process for the main memory, address data stored in the cache memory corresponding to the detected write address for the main memory are invalidated. This address monitoring device comprises, a comparing unit 2 for comparing an address of data written into an external memory (main memory M) by an external device with an address of data stored in a cache memory (821), a masking unit 3 for masking specific bits obtained by a result in the address comparing unit 2, and an invalidating unit 1 for invalidating data stored in the cache memory corresponding to the specific bits masked by the masking unit 3.

In the address monitoring device having the explained constitution, an address of data written into a main memory by an external device is compared with an address of data stored in a cache memory by the address comparing unit 2, specific bits obtained by a result in the address comparing unit 2 are masked by the masking unit 3, and data stored in the cache memory corresponding to the specific bits are invalidated by the invalidating unit 1.

Incidentally, in a block transfer process, a beginning address is only supplied to the main memory M, and the following addresses are not supplied but are incremented sequentially in the main memory M, so that data of a predetermined address range are transferred from an external device (for example, another data processing device or a direct memory access controller) to the main memory M. Nevertheless, in the address monitoring device according to the present invention, the specific bits, which correspond to the data following from the beginning address and which are incremented sequentially in the main memory M, are invalidated by the invalidating unit 1. Therefore, even when a block transfer process is carried out, inconsistency between the main memory and the cache memory is prevented.

Figure 5:
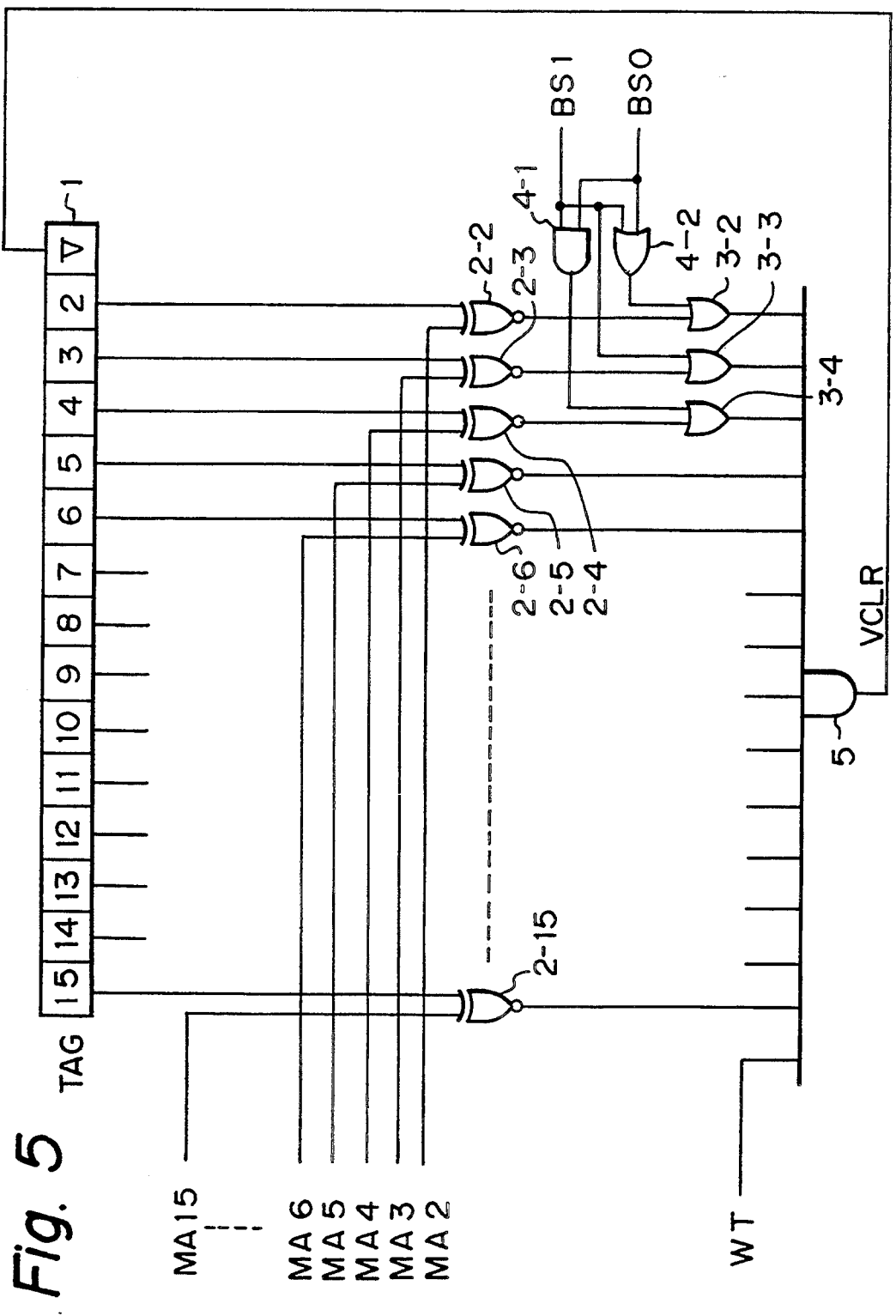
FIG. 5 is a circuit diagram illustrating one embodiment of the address monitoring device according to the present invention.

FIG. 5 is a circuit diagram illustrating one embodiment of the address monitoring device according to the present invention.

As shown in FIG. 5, the address monitoring device of the present embodiment comprises a plurality of ENOR gates 2-2 to 2-15, AND gates 5, 4-1, and OR gates 3-2, 3-3, 3-4, 4-2. In FIG. 5, reference number 1 denotes a tag memory which includes valid bit portion V and stores addresses of data stored in a cache memory (for example, an operand cache 821 in FIG. 8). Note, valid bits stored in the valid bit portion V (which is indicated by reference numeral 91 in FIG. 9) indicates validity of data stored in the cache memory. If a memory access is required, and by a comparing portion (which is indicated by reference numeral 92 in FIG. 9), a required address and an address of data stored in the cache memory are compared, and if the required address and the stored address coincide and valid bits for the stored address indicate validity, then the tag memory is used to deliver the contents of the cache memory.

Each of the ENOR gates 2-2 to 2-15 is supplied with addresses 2 to 15 stored in the tag memory 1 and access addresses MA2 to MA15. Note, the addresses 2 to 15 are stored in the tag memory 1 corresponding to data of the cache memory (for example, a cache memory in microprocessing unit MPU1 in FIG. 1), and the access addresses MA2 to MA15 are those of the main memory M used by the other bus masters (for example, the other microprocessing unit MPU2 and a direct memory access controller DMAC in FIG. 1), Inputs of the AND gate 4-1 and the OR gate 4-2 are supplied with mask control signals BS0, BS1, one input of the OR gate 3-4 is supplied with an output signal of the AND gate 4-1, and one input of the OR gate 3-2 is supplied with an output signal of the OR gate 4-2. One input of the OR gate 3-3 is supplied with the mask control signal BS1, Note, the other inputs of the OR gates 3-2, 3-3, 3-4 are supplied with output signals of the ENOR gates 2-2, 2-3, 2-4, respectively.

Inputs of the AND gate 5 are supplied with output signals of the OR gates 3-2, 3-3, 3-4, output signals of the ENOR gates 2-5 to 2-15, and a timing signal WT for writing to the main memory, If the addresses 2 to 15 and the corresponding access addresses MA2 to MA15 of the main memory coincide with each other, the respective ENOR gates 2-5 to 2-15 output high level signals to the inputs of the AND gate 5, so that the AND gate 5 outputs a signal VCLR at a high level to carry out an invalidation of valid bit V in the tag memory 1. In the above, the signal level, logic gate, and the like can be varied in many ways.

The OR gates 3-2, 3-3, 3-4 are provided for the addresses 2, 3, 4 which require mask processing, and output signal levels of the OR gates 3-2, 3-3, 3-4 are controlled by the mask control signals BS0, BS1. Concretely, if the mask signals BS0, BS1 are determined as (0, 0), (1, 0), (0, 1) (1, 1), then output signal levels of the OR gates 3-2, 3-3, 3-4 are made (0, 0, 0) , (1, 0, 0), (1, 1, 0), (1, 1, 1). Note, when output signals of the OR gates 3-2, 3-3, 3-4 are all at "0" (low level), output signal levels of the ENOR gates 2-2, 2-3, 2-4 are output as they are from the OR gates 3-2, 3-3, 3-4.

Figure 6:
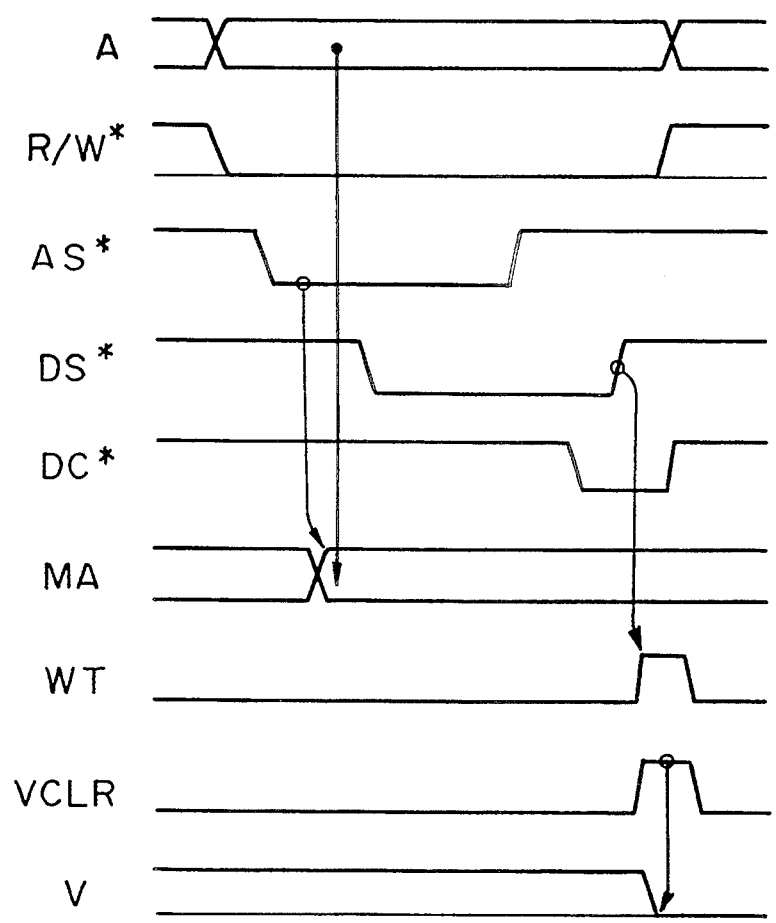
FIG. 6 is a timing chart for explaining an operation in the address monitoring device shown in FIG. 5.

FIG. 6 is a timing chart for explaining an operation in the address monitoring device shown in FIG. 5.

As shown in FIG. 6, for example, when a writing operation for a main memory is carried out by another microprocessor unit MPU or a direct memory access controller DMAC, an address A is specified, a read-write signal R/W* changes to a low level, and then an address strobe signal AS* changes to a low level, so that a data transfer process (block transfer process) is started. Further, when a data strobe signal DS* changes to a low level, data transfer process is carried out, and after completing the data transfer process, a data complete signal DC* changes to a low level.

Incidentally, as described above with reference to FIG. 2, in the block transfer process, a beginning address is only supplied to the main memory M, and the following addresses from the beginning address are not supplied but are incremented sequentially in the main memory M, so that data of a predetermined address range are transferred from an external device to the main memory M. In the address monitoring device shown in FIG. 5, the mask control signals BS0, BS1 are made (0, 0), (1, 0), (0, 1), (1, 1), output signal levels of the OR gates 3-2, 3-3, 3-4 are made (0, 0, 0), (1, 0, 0), (1, 1, 0), (1, 1, 1) in accordance with the mask control signals BS0, BS1, regardless of the output signal levels of ENOR gates 2-2, 2-3, 2-4, or comparison results between the addresses 2 to 4 stored in the tag memory 1 and the addresses MA2 to MA4 which are addresses in the main memory M written to another bus master. Note, as described before, when output signals of the OR gates 3-2, 3-3, 3-4 are all at "0", output signal levels of the ENOR gates 2-2, 2-3, 2-4 are output as they are from the OR gates 3-2, 3-3, 3-4. Namely, output signal levels of those OR gates 3-2, 3-3, 3-4 are the same of that of the ENOR gates 2-2, 2-3, 2-4. Therefore, when an address whose specific bits are masked and stored in the tag memory 1 coincides with an address written in the main memory M by a bus master, as shown in FIG. 6, the AND gate 5 outputs a VCLA signal at a high level at the timing of a timing signal WT, and the valid bits of the tag memory 1 become invalid.

In the above described manner, with the address monitoring device of the present embodiment, the addresses to be compared are masked by the OR gates 3-2 3-3, 3-4. Concretely, when the mask control signals BS0, BS1 are determined as (0, 0), the monitored addresses are compared by an address unit represented by bits 15 to 2 (if the address unit is described by byte address, then a 4-byte unit), and when the mask control signals BS0, BS1 are determined as (1, 1), the monitored addresses are compared by an address unit represented by bits 15 to 5 (if the address unit is described by byte address, then a 32-byte unit). Consequently, when the mask control signals BS0, BS1 are determined as (1, 1), the monitored addresses are compared by a unit larger than the address stored the tag memory 1. Namely, when the block transfer process is carried out, that is, when only a beginning address is supplied to the main memory M, and the following addresses are not supplied but are incremented sequentially in the main memory M, or some differences exist between addresses actually written in the main memory M and the supplied address (beginning address), inconsistency between data stored in the main memory M and data stored in the cache memory can be prevented. Note, when the mask control signals BS0, BS1 are determined as (1, 0), the monitored addresses are compared by an address unit represented by bits 15 to 3, and when the mask control signals BS0, BS1 are determined as (0, 1), the monitored addresses are compared by address unit represented by bits 15 to 4. Note, the mask control signals BS0, BS1 can be used as input signals from external terminals or output signals from an internal register provided in the data processing device.

Figure 7:
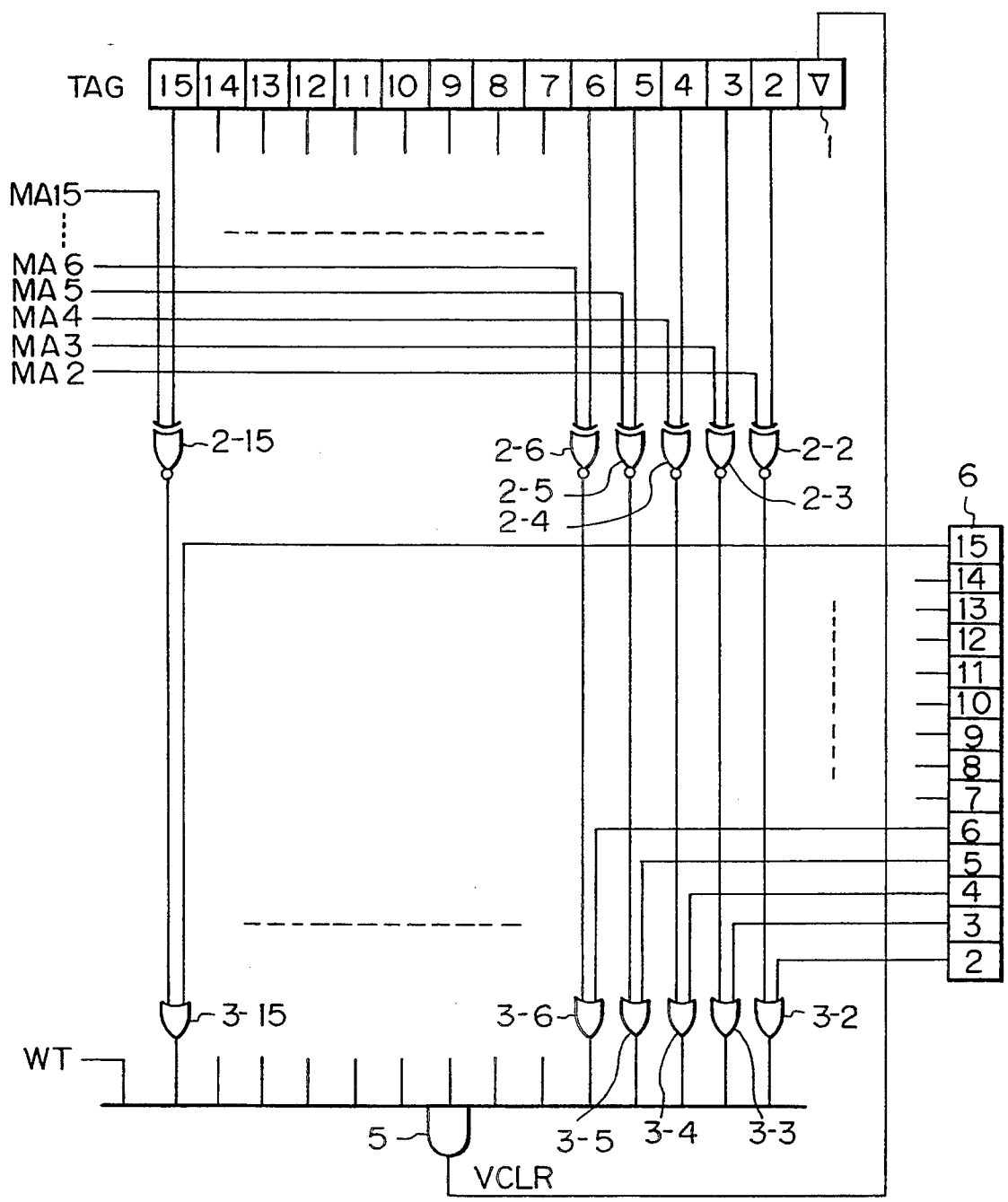
FIG. 7 is a circuit diagram illustrating a modified embodiment of an address monitoring device according to the present invention.

FIG. 7 is a circuit diagram illustrating a modified embodiment of an address monitoring device according to the present invention. An embodiment of the address monitoring device shown in FIG. 7, is so constituted that as shown in FIG. 2, the mask address (specific bits) are determined by output signals from a register 6 provided for the mask address control, which corresponds to the mask address control signals BS0, BS1 and the AND gate 4-1, and the OR gate 4-2 provided in the address monitoring device shown in FIG. 5, and thus, the masking address control process of the present embodiment is directly carried out by only using the register 6. Namely, in the address monitoring device according to the present embodiment, the addresses requiring masking are set at high levels, and these high level signals set in the register are supplied to the OR gates 3-2 to 3-15, and the specific bits corresponding to outputs signals of high levels of the OR gates 3-2 to 3-15 are masked.

Figure 8B:
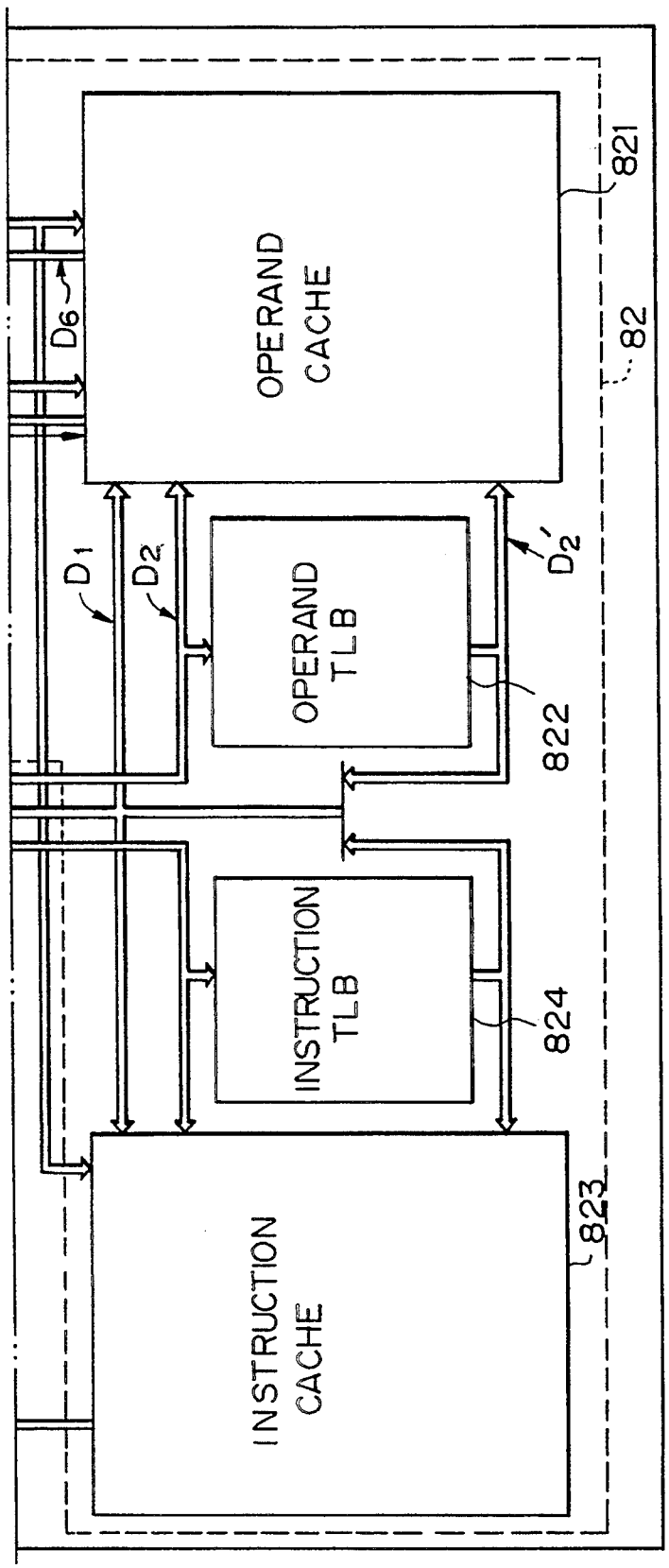
FIG. 8 consisting of FIGS. 8A and 8B is a block diagram illustrating an example of a data processing device according to the present invention.

FIG. 8 is a block diagram illustrating an example of a data processing device according to the present invention. As shown in FIG. 8, the microprocessor unit (data processing device) MPU, which is a monolithic microprocessor formed in a single semiconductor body, comprises a bus control unit 81, a memory control unit 82, an instruction control unit 83, and an instruction execution unit 84.

The bus control unit 81 transfers data among an external I/O, the main memory (external memory) M, another microprocessing unit MPU2, and the like through the chip bus. The bus control unit 81 includes an address control portion, an address monitor control block access portion, and a data transferring portion. The bus control unit 81 has a block access function transferring one block (for example, 16 bytes of data) to the cache memory at high speed, and an address monitoring function for making the contents of the cache memory and the external memory coincide by monitoring a write address on the chip bus.

The memory control unit 82 comprises an operand cache (memory) 821, an operand TLB 822, an instruction cache 823, and an instruction TLB 824. The operand cache 821 and the operand TLB 822 are included in an operand access control portion, the instruction cache 823 and the instruction TLB 824 are included in an instruction access control portion, and the operand access control portion and the instruction access control portion can operate independently in accordance with control signals output from the instruction execution unit 84. Note, the process of writing instruction execution data is carried out by using a store-through method. When a chip bus is being used, the address and the data are stored in a storage buffer until the data can be output. In the case that an area indicated by a write address is stated in the instruction cache., an entry corresponding to the area in the instruction cache is invalidated at the timing of writing to the external memory.

The instruction control unit 83, which is used to control fetching, decoding, and executing of instructions, comprises an instruction decoder 831, an instruction queue (instruction buffer) 832, an exception processing control portion 833 and a pipeline control portion 834. The instruction queue 832 is used to efficiently process a variable word length instruction. A prefetching operation for instructions is continuously carried out until the instruction queue 832 has no vacant buffer area. Note, this instruction prefetching operation is independently carried out without executing the instructions. Further, when a required instruction is stored in the instruction queue 832, an access of an external memory (main memory) is not carried out. In the instruction decoder 831, an instruction format, an instruction type, and an addressing mode are analyzed, and information for controlling a pipeline process, calculating an operand address, and starting a microprogram is output therefrom. The exception processing control portion 833 is used to control an exception process. In the pipeline control portion 834, an instruction is divided into five independent stages ( five-stage pipeline processing) in one machine cycle, and is continuously executed.

The instruction execution unit 84, which is used to calculate an operand address and carry out an operand operation, comprises an address generation portion 841, a register file 842, an arithmetic portion 423, and a microprogram (ROM) 844. In the address generation portion 841, an address calculation is carried out in accordance with the addressing mode, and the generated address is transferred to the memory control unit 82. The register file 842 includes general purpose registers, work registers, and stack pointers. The arithmetic portion 843, where a basic operation is carried out, has exclusive circuits for bit field manipulation instructions, multiply-divide calculation instructions, and decimal operation advancing instructions, and operand processes for these instructions are efficiently carried out. The microprogram 844, which is constituted by a read only memory, outputs detailed control information to the arithmetic portion 843.

In the data processing device shown FIG. 8, the tag memory 1, the comparing unit 2, and the masking unit 3 in the address monitoring device according to the present invention are provided in the memory control unit 82 (the operand cache 821 and the instruction cache 823), and the mask bit determining unit 4 is provided in the instruction execution unit 84 (the register file 842).

FIG. 9 is a block diagram illustrating an address monitoring device provided in the data processing device shown in FIG. 8. In FIGS. 8 and 9, references $D_1$ to $D_7$ denote data or addresses. As shown in FIG. 9, an external address $D_1$ is supplied to a comparing portion 93 (address comparing unit 2) and a tag memory 90 (1), access requiring addresses $D_2$, $D_2'$ are supplied to the tag memory 90 and a comparing portion 92, and addresses stored in a register 842 (mask bit determining unit 4) are supplied to a mask portion 94 (masking unit 3). In FIG. 9, reference numeral 91 denotes a valid bit portion (V) in the tag memory 90, data $D_3$ and $D_4$ are data transferred between the arithmetic portion 843 and operand cache 821 (tag memory 90), and data $D_5$ and $D_6$ are data transferred between the main memory M or another external devices and the operand cache 821 through the system bus (external bus) SB.

In the address monitoring device shown in FIG. 9, the comparing portion 92 receives the access requiring address $D_2$, $D_2'$ and address data stored in the tag memory 90 (operand cache 821), and compares the required addresses $D_2$, $D_2'$ with the stored address in the operand cache 821. When the required address and the stored address coincide and valid bits for the stored address indicate validity, then the tag memory 90 outputs the data to the arithmetic portion 843 as data $D_3$. Further, the comparing portion 93 receives an address of data written into the in memory M by an external device (another microprocessing unit or a direct memory access controller) and address data stored in the tag memory 90 (operand cache 821), and compares the write data address of the main memory M with the stored address in the operand cache 821. When the write data address of the main memory M coincides to the stored address in the operand cache 821, specific bits obtained by a result in the comparing portion 93 are masked by the masking portion 94. Note, the specific bits correspond to the data following a beginning address and are incremented sequentially in the main memory M, when a block transfer process is carried out.

In the above description, the address monitoring device is not only provided in the operand cache 821, but can be provided in the instruction cache 823.

As described above, in the address monitoring device according to the present invention, a comparing unit compares an address of data written into a main memory by an external device with an address of data stored in a cache memory, and a masking unit masks specific bits obtained by a result in the address comparing unit. An invalidating unit invalidates data stored in the cache memory corresponding to the specific bits masked by the masking unit. Note, when a block transfer process from an external device to a main memory is carried out, the specific bits correspond to the data following the beginning address and being incremented sequentially in the main memory. Therefore, inconsistency between the main memory and the cache memory can be prevented, even when the data are transferred by using a block transfer process.

Many widely differing embodiments of the present invention may be constructed without departing from the spirit and scope of the present invention, and it should be understood that the present invention is not limited to the specific embodiments described in this specification, except as defined in the appended claims.

We claim:

1. An address monitoring device for monitoring a process of writing to a main memory by an external device, in which, when an address corresponding to data stored in a cache memory is detected in said write process, stored address data in said cache memory corresponding to said detected write address is invalidated, said address monitoring device comprising:
   a comparing means for comparing an address of data written into said main memory by said external device with an address of data stored in said cache memory;
   a masking means for specifying at least one specific bit within the address of the data stored in said cache memory to compare with the address of the data written into said main memory;
   an invalidating means for invalidating data stored in said cache memory, when a result in said address comparing means is coincidental;
   a mask bit determining means for determining a number of masked bits for masking in said specific bits;
   wherein said mask bit determining means determines the number of masked bits for masking in said specific bits in accordance with a data length of said data written into said main memory, and wherein said data are written into said main memory by using a block transfer process.

2. An address monitoring device as claimed in claim 1, wherein said mask bit determining means comprises a plurality of logic gate circuits, and the number of masked bits for masking in said specific bits are determined by masking control signals supplied to said logic gate circuits.

3. An address monitoring device as claimed in claim 1, wherein said mask bit determining means comprises a masking address control register, and the number of masked bits for masking in said specific bits are determined by data stored in said masking address control register.

4. An address monitoring device as claimed in claim 1, wherein said comparing means and said masking means comprise a plurality of logic gate circuits.

5. An address monitoring device as claimed in claim 1, wherein said invalidating means comprises a tag memory including a valid bit portion.

6. A data processing device comprising:
   a bus control unit for transferring data among a main memory and external devices through busses;
   a memory control unit including a cache memory;

an instruction control unit for controlling fetching and decoding of instructions;

an instruction execution unit for executing said instructions;

a comparing means for comparing an address of data written into a main memory by said external device with an address of data stored in said cache memory;

a masking means for specifying at least one specific bit within the address of the data stored in said cache memory to compare with the address of the data written into said main memory; and an invalidating means for invalidating data stored in said cache memory, when a result in said address comparing means being coincidental;

a mask bit determining means for determining a number of masked bits for masking in said specific bits;

wherein said mask bit determining means determines the number of masked bits for masking in said specific bits in accordance with a data length of said data written into said main memory, and wherein said data are written into said main memory by using a block transfer process.

7. A data processing device as claimed in claim 6, wherein said mask bit determining means comprises a plurality of logic gate circuits, and the number of masked bits for masking in said specific bits are determined by masking control signals supplied to said logic gate circuits.

8. A data processing device as claimed in claim 6, wherein said mask bit determining means comprises a masking address control register, and the number of masked bits for masking in said specific bits are determined by data stored in said masking address control register.

9. A data processing device as claimed in claim 6, wherein said comparing means and said masking means comprise a plurality of logic gate circuits.

10. A data processing device as claimed in claim 6, wherein said invalidating means comprises a tag memory including a valid bit portion.

11. A data processing device as claimed in claim 6, wherein said external device writing data into said main memory is one of a further data processing device and a direct memory access controller, and is connected to said data processing device and said main memory through a system bus.

12. A data processing system having a data processing device, external devices, a main memory, and a system bus for connecting said data processing device, said external devices, and said main memory, said data processing device comprising:

a bus control unit for transferring data among said main memory and said external devices through a bus;

a memory control unit including a cache memory;

an instruction control unit for controlling fetching and decoding of instructions;

an instruction execution unit for executing said instructions;

a comparing means for comparing an address of data written into a main memory by an external device with an address of data stored in said cache memory;

a masking means for specifying at least one specific bit within the address of the data stored in said cache memory to compare with the address of the data written into said main memory; and an invalidating means for invalidating data stored in said cache memory, when a result in said address comparing means is coincidental;

a mask bit determining means for determining a number of masked bits for masking in said specific bits;

wherein said mask bit determining means determines the number of masked bits for masking in said specific bits in accordance with a data length of said data written into said main memory, and wherein said data are written into said main memory by using a block transfer process.

13. A data processing system as claimed in claim 12, wherein said data processing device further comprises a mask bit determining means for determining a number of masked bits for masking in said specific bits.

14. A monolithic microprocessor formed in a single semiconductor body, said monolithic microprocessor comprising:

a built-in cache memory;

an instruction execution means, for executing an instruction and outputting a write address for accessing one of said built-in cache memory and a main memory; and an address monitoring device comprising:

a comparing means for comparing an address of data written into a main memory by an external device with an address of data stored in a cache memory;

a masking means for specifying at least one specific bit within the address of the data stored in said cache memory to compare with the address of the data written into said main memory; and an invalidating means for invalidating data stored in said cache memory, when a result in said address comparing means is coincidental;

a mask bit determining means for determining a number of masked bits for masking in said specific bits;

wherein said mask bit determining means determines the number of masked bits for masking in said specific bits in accordance with a data length of said data written into said main memory, and wherein said data are written into said main memory by using a block transfer process.

15. A monolithic microprocessor as claimed in claim 14, wherein said mask bit determining means comprises a plurality of logic gate circuits, and the number of masked bits for masking in said specific bits are determined by masking control signals supplied to said logic gate circuits.

16. A monolithic microprocessor as claimed in claim 14, wherein said mask bit determining means comprises a masking address control register, and the number of masked bits for masking in said specific bits are determined by data stored in said masking address control register.

17. A monolithic microprocessor as claimed in claim 14, wherein said comparing means and said masking means comprise a plurality of logic gate circuits.

18. A monolithic microprocessor as claimed in claim 14, wherein said invalidating means comprises a tag memory including a valid bit portion.

19. A monolithic microprocessor as claimed in claim 14, wherein said external device writing data into said main memory is one of a further monolithic microprocessor and a direct memory access controller, and is connected to said data processing device and said main memory through a system bus.

* * * * *

UNITED STATES PATENT AND TRADEMARK OFFICE
CERTIFICATE OF CORRECTION

PATENT NO. :    5,379,402
DATED      :    January 3, 1995
INVENTOR(S):    FUJIHIRA et al.

It is certified that error appears in the above-identified patent and that said Letters Patent is hereby corrected as shown below:

On the Title page, Item [75], "Atsushi FUJIHARA" should read --Atsushi FUJIHIRA--.

Signed and Sealed this

Sixteenth Day of January, 1996

Attest:

BRUCE LEHMAN

*Attesting Officer*     Commissioner of Patents and Trademarks